Oct. 27, 1964    F. J. BRIGHT    3,154,707
ANTI-STICTION DEVICE FOR ROTATING ELECTRICAL COMPONENTS
Filed May 16, 1963

United States Patent Office 3,154,707
Patented Oct. 27, 1964

3,154,707
ANTI-STICTION DEVICE FOR ROTATING
ELECTRICAL COMPONENTS
Frederick James Bright, Beckenham, Kent, England,
assignor to Muirhead & Co., Limited, Kent, England
Filed May 16, 1963, Ser. No. 280,882
Claims priority, application Great Britain Apr. 23, 1963
3 Claims. (Cl. 310—166)

This invention relates to rotating electrical components known under the generic names "Magslip" and "Synchro." These components are widely used for remote control, remote indicating and data processing systems. Many types have been evolved to perform various functions, for example transmitters, receivers, control transformers and resolvers. In general appearance these rotating electrical components resemble small alternating current electric motors, and comprise a stator element carrying one or more electrical windings contained in slots therein, and a rotor, provided with one or more windings which are energized through the medium of sliprings and brushes.

In particular components known as torque transmitters and torque receivers the rotor carries a single winding which is energized from a suitable alternating current supply. The stator core carries three identical windings whose axes are spaced 120 electrical degrees apart and interconnected in either star or delta configuration. When the stator windings of a torque transmitter are connected to the corresponding windings of a torque receiver and their rotors are energized from a common alternating current source, the voltages induced in the transmitter stator coils cause currents to flow in the receiver stator coils and a magnetic field is produced in the receiver having its axis coincident with that of the field in the transmitter. The receiver rotor will then align itself with the axis of the stator magnetic field.

Thus, there is provided a data transmission system in which the rotor of the receiver will follow the motions of the transmitter rotor within the limits imposed by bearing and brush friction and mechanical loading.

An inherent disadvantage of this type of receiver is that if several receivers are being controlled by a common transmitter and one of the receivers is restrained for any reason, angular errors will be introduced in the remaining receivers due to the strong magnetic coupling that exists between the rotor and stator systems.

In another known kind of receiver, the rotor does not carry an energizing winding but is magnetized by a fixed polarizing winding, thus obviating the necessity of sliprings and brushes. The design involving a weak magnetic field and the greatly increased airgap occasioned by indirect polarization of the rotor results in practically no interaction between parallel connected receivers but on the other hand the torque produced in the rotor is correspondingly reduced. Consequently, although brush friction has been eliminated great care has to be taken to reduce bearing friction to a minimum and break down the viscous drag of the bearing lubricant which results in what is commonly known as "stiction." To overcome the latter effect a slight amount of axial movement of the shaft induced by the alternating magnetic field, is deliberately produced.

In the known kind of receiver the supply frequency is of the order of 50 cycles per second and this results in effective axial movement or "dither" of the rotor shaft. However, when adapting the design to the requirements of the North Atlantic Treaty Organization (NATO) where the specified frequency of the supply is 400 cycles per second the inertia of the rotor prevents effective dither action at the higher frequency.

It is an object of the invention to produce a rotor element for a synchro receiver in which dither action occurs which is adequate to break down stiction in the rotor bearings at relatively high frequencies without reducing the useful mass of the rotor element.

The invention consists in a rotating alternating current electric component in which a thin reed or flap of a suitable magnetic material is attached to the rotor element in such a position that it is influenced by the polarizing magnetic field. This reed or flap, because of its low mass and inertia, vibrates effectively at twice the supply frequency (800 c./s.) and imparts axial vibrations to the rotor and the rotor shaft, thereby providing the required dither effect.

An embodiment of the invention thereof will be described by way of example with reference to the accompanying drawings in which.

It will be understood that like characters refer to like parts in the drawings.

Figure 1:
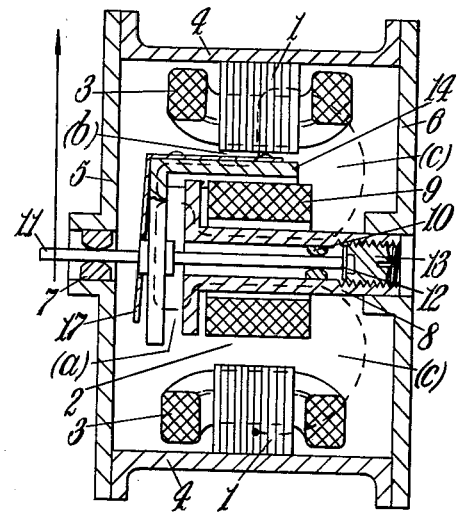
FIGURE 1 is a half section of a synchro receiver.

Referring now to the drawings, the stator assembly 1 comprises a stack of laminations made from a high permeability magnetic material. The stator assembly is provided with a concentric bore and slots on its internal surface contain the stator windings 3.

The stator assembly is centrally mounted in cylindrical case 4 provided with end plates 5 and 6. End plate 5 is adapted to take journal 7. End plate 6 provides a support for the hollow magnetic core 8 of a fixed polarizing coil 9 connectable to alternating current supply. Journal 10 is secured within the hollow part of magnetic core 8. Rotor shaft 11 is supported in journals 7 and 10 and the inner end thereof abuts spring 12, the axial position of which may be adjusted by means of screws 13.

It will be observed that the bearing surfaces of journals 7 and 10 are radiused to ensure minimum bearing contact between the journals and the shaft.

Figure 2:
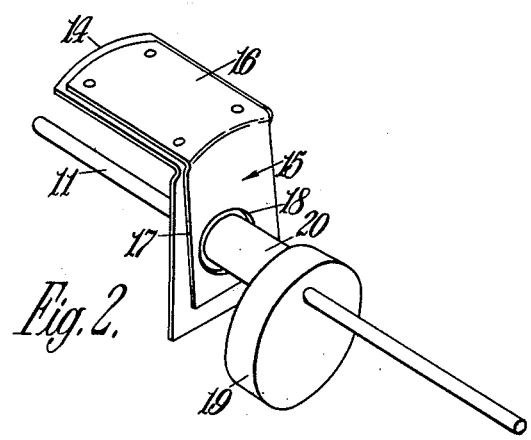
FIGURE 2 is a three-dimensional view of a synchro rotor and shaft according to the invention.

The rotor element 14 is rigidly mounted on shaft 11 as shown in FIGURE 1 and comprises an L-shaped strip of high permeability magnetic material so mounted on shaft 11 that one limb occupies a part of air gap 2 and for this reason the limb is contoured to the radius of the centre of the air gap. The reed or flap 15 comprises an L-shaped flexible strip of high permeability magnetic material of lighter section havinng the general form of rotor element 14. As is clearly shown in FIGURE 2 the radiused limb 16 of reed or flap 15 is spot welded or otherwise rigidly attached to the radiused limb or rotor element 14 and the flat limb 17 thereof is slightly angled with respect to the flat limb of the rotor element to allow it to vibrate freely under the influence of the alternating magnetic field. Clearance hole 18 is also provided so that the vibrations are not impeded by rotor hub 20. Mass 19 is attached to shaft 11 to balance the rotor assembly 14, 15.

The broken line in FIGURE 1 generally indicates the magnetic flux path within the receiver. It will be seen that the flux produced in magnetic core 8 when coil 9 is energized from the alternating current supply crosses air gap (a) and enters rotor element 14. From thence it crosses air gap (b) and enters stator core 1 and returns to the magnetic core 8 via the diffused air gap (c). Each half cycle of alternating flux will exert a force tending to pull rotor 14, both axially and radically. The radial force is resisted by the stiffness of the shaft causing no significant movement. The axial force produces an axial movement of the shaft which is limited by spring 12. When the alternating flux falls to zero the force is removed and the spring, in returning to its unflexed condition also returns the shaft to its original position.

Thus an axial oscillation of the shaft produced.

As explained above, due to the mass of the rotor the effective movement of the shaft at relatively high frequencies is small but this is amplified or reinforced by the vibrational forces of the attached reed or flap which vibrates freely. To obtain maximum reinforcement it is desirable to tune the reed to twice the frequency of the alternating flux.

I claim:

1. A rotating alternating current electrical component comprising a stator element carrying at least one electrical winding contained in slots therein, a rotor of high permeability magnetic material, at least one polarizing winding for the rotor and a thin flexible member for the rotor mounted on the rotor in a position in which it is influenced by the magnetic field passing therethrough so as to vibrate and thereby impart axial vibrations to the rotor.

2. A rotating alternating current electrical component comprising a stator element carrying at least one electrical winding, a rotor of high permeability material mounted within the stator element for rotational and limited axial movement, a spring restraining the axial movement of the rotor in one direction, at least one polarizing winding mounted around the rotor, a thin flexible member mounted on the rotor in a position in which it is influenced by the magnetic field passing therethrough so as to vibrate and thereby impart axial vibration to the rotor.

3. A rotating alternating current electrical component comprising a stator of laminations of high permeability material having a circular, slotted bore, stator windings mounted within the slots, a case supporting the stator and having end plates, journals supported by one of the end plates, a hollow magnetic core mounted on the other end plate and extending within the stator with an air gap therebetween, journals mounted within the hollow magnetic core, a rotor shaft supported in the journals of the end plate magnetic core, a spring mounted within the magnetic core and abutting one end of the rotor shaft, a polarizing winding mounted on the magnetic coil for connection to an A.C. supply, a rotor element of high permeability magnetic material mounted on the shaft and extending into part of the air gap between the stator and core so as to be rotatable therearound, a thin flexible strip of high permeability material mounted on the rotor element in a position in which it is influenced by the magnetic field passing through the rotor so as to vibrate at twice the alternating current frequency and thereby impart axial vibrations to the rotor.

No references cited.